US010830969B2

(12) United States Patent
Saito (10) Patent No.: US 10,830,969 B2
(45) Date of Patent: Nov. 10, 2020

(54) OPTICAL COMPONENT, INJECTION MOLDING DIE FOR OPTICAL COMPONENT, AND INJECTION MOLDING METHOD FOR OPTICAL COMPONENT (71) Applicant: ENPLAS CORPORATION, Saitama (JP)

(72) Inventor: Yuki Saito, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/349,852

(22) PCT Filed: Oct. 27, 2017

(86) PCT No.: PCT/JP2017/038891
§ 371 (c)(1),
(2) Date: May 14, 2019

(87) PCT Pub. No.: WO2018/092546
PCT Pub. Date: May 24, 2018

(65) Prior Publication Data
US 2019/0278034 A1 Sep. 12, 2019

(30) Foreign Application Priority Data

Nov. 15, 2016 (JP) .................. 2016-222574

(51) Int. Cl.
G02B 6/42 (2006.01)
B29C 45/37 (2006.01)
(Continued)

(52) U.S. Cl.
CPC ......... G02B 6/4214 (2013.01); G02B 6/4206 (2013.01); B29C 45/37 (2013.01);
(Continued)

(58) Field of Classification Search
None
See application file for complete search history.

(56) References Cited

U.S. PATENT DOCUMENTS

2005/0147353 A1   7/2005   Vancoill et al.
2012/0318964 A1*  12/2012  Yamamoto ............. G02B 6/138
                                                          250/227.11
2016/0039130 A1   2/2016   Goshima et al.

FOREIGN PATENT DOCUMENTS

CN   105050792   11/2015
JP   6-328522    11/1994
(Continued)

OTHER PUBLICATIONS

International Search Report dated Jan. 23, 2018 in International (PCT) Application No. PCT/JP2017/038891.

Primary Examiner — Jerry Rahll
(74) Attorney, Agent, or Firm — Wenderoth, Lind & Ponack, L.L.P.

(57) ABSTRACT

An optical component is configured to optically connect a light-emitting element and an optical fiber, and includes an optical surface arranged in a middle of an optical path of a light to be emitted from the light-emitting element to the optical fiber to reflect the light. The optical surface includes an optical path area configured to reflect the light and a non-optical path area other than the optical path area, and the optical path area and the non-optical path area are coplanar. The optical path area has a smooth surface, and at least a part of the non-optical path area has a rough surface which is rougher than the optical path area.

10 Claims, 10 Drawing Sheets (51) Int. Cl.
*B29K 79/00* (2006.01)
*B29L 11/00* (2006.01)
*G02B 6/32* (2006.01)

(52) U.S. Cl.
CPC . *B29K 2079/085* (2013.01); *B29L 2011/0016* (2013.01); *G02B 6/32* (2013.01); *G02B 6/42* (2013.01)

(56) References Cited

FOREIGN PATENT DOCUMENTS

| | | |
|---|---|---|
| JP | 2002-326260 | 11/2002 |
| JP | 2009-163213 | 7/2009 |
| JP | 2012-163904 | 8/2012 |
| JP | 2015-132752 | 7/2015 |
| JP | 2016-33600 | 3/2016 |
| JP | 2016-48284 | 4/2016 |
| WO | 2014/148072 | 9/2014 |

* cited by examiner

OPTICAL COMPONENT, INJECTION MOLDING DIE FOR OPTICAL COMPONENT, AND INJECTION MOLDING METHOD FOR OPTICAL COMPONENT

TECHNICAL FIELD

The present invention relates to an optical component having an optical surface that transmits or reflects a light as a smooth surface having no wrinkle, an injection molding die for the optical component, and an injection molding method for the optical component.

BACKGROUND ART

As illustrated in FIGS. 9A-9D, an optical receptacle 100 as an optical component known in the prior art is used to input a light H emitted from a light-emitting element (photoelectric conversion element) 101 to a first optical surface 102 as a parallel light, reflect the incident light on a second optical surface 103, and condense the reflection light (parallel light) on a light-receiving surface of the optical fiber 105 as an optical transmission member via a third optical surface 104. Alternatively, the optical receptacle 100 is used to input the light H emitted from the light-emitting surface of the optical fiber 105 as a parallel light via the third optical surface 104, reflect the incident light on the second optical surface 103, and condense the reflection light (parallel light) on a light-receiving surface of the photodetector (photoelectric conversion element) 101 via the first optical surface 102 (see Patent Documents 1 and 2).

Figure 10:
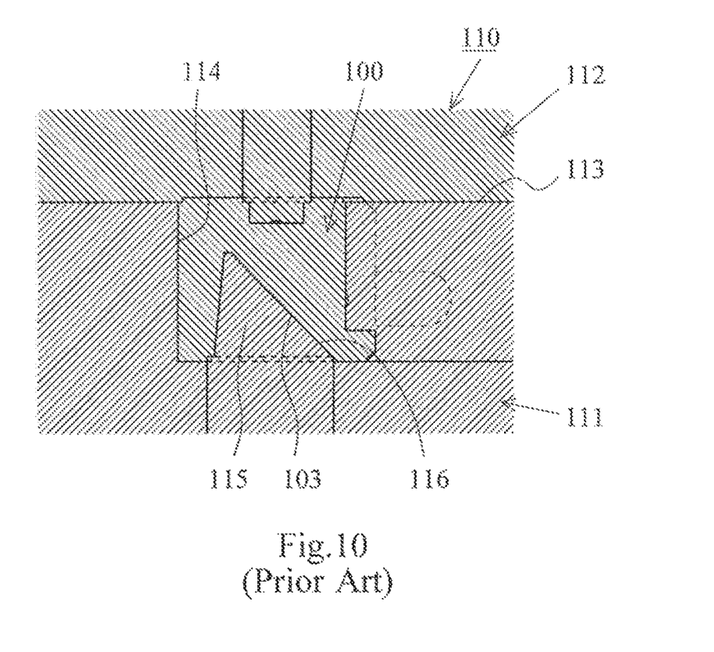
FIG. 10 is a schematic diagram illustrating an injection molding die for injection-molding the optical receptacle of the prior art.

FIG. 10 is a diagram illustrating an injection molding die 110 used to manufacture the optical receptacle 100. The injection molding die 110 has a cavity 114 formed on a die joint surface 113 side between a fixed die 111 and a movable die 112. The optical receptacle 100 is manufactured by pressure-holding and cooling molten resin injected into the inside of the cavity 114, separating the movable die 112 from the fixed die 111 (releasing the dies), and then extruding the optical receptacle 100 as an injection molding product from the inside of the cavity 114 of the fixed die 111 using an ejector pin (not shown) (see Patent Documents 2 to 4).

CITATION LIST

Patent Documents

Patent Document 1: Japanese Patent Application Unexamined Publication No. 2016-33600 (see paragraphs [0030] and [0031]);

Patent Document 2: Japanese Patent Application Unexamined Publication No. 2016-48284 (see paragraphs [0020], [0029], and [0030]);

Patent Document 3: Japanese Patent Application Unexamined Publication No. 2009-163213 (see paragraphs [0049]), and Patent Document 4: Japanese Patent Application Unexamined Publication No. 2015-132752 (see paragraphs [0025] to [0028]).

SUMMARY OF INVENTION

However, in the optical receptacle 100 of FIGS. 9A-9D, since the second optical surface 103 as a reflection surface is designed to have a smooth surface, an adhesion force between a surface 116 of the second optical surface formation piece 115 of the fixed die 111 and a second optical surface 103 is large (the second optical surface 103 is adhered to a surface 116 of the second optical surface formation piece 115), so that streaky wrinkles (molding failure) occur on the second optical surface 103, and the surface roughness of the second optical surface 103 increases in some cases when the optical receptacle 100 is extruded from the inside of the cavity 114 of the fixed die 111 using the ejector pin (not shown). In the optical receptacle 100 having such a molding failure, a surface that actually reflects a light on the second optical surface 103 (the surface of the optical path area) has a high surface roughness, and it is difficult to accurately reflect the light H incident from the first optical surface 102 on the surface of the optical path area. Therefore, it is difficult to input a part of the light incident from the first optical surface 102 to the light-receiving surface of the optical fiber 105 via the third optical surface 104 or to accurately reflect the light H incident from the third optical surface 104 on the surface of the optical path area of the second optical surface 103. This makes it difficult to input a part of the light incident from the third optical surface 104 to the light-receiving surface of the photodetector (photoelectric conversion element) 101 via the first optical surface 102, so that the optical component having degraded quality may be provided as a defective product in practical use (production efficiency is degraded) disadvantageously. In addition, such a problem of the second optical surface 103 also occurs on the first optical surface 102 when the first optical surface 102 is designed to have a smooth surface as a whole. Furthermore, such a problem of the second optical surface 103 also occurs on the third optical surface 104 when the third optical surface 104 is designed to have a smooth surface as a whole. That is, the problem of the second optical surface 103 of the optical receptacle 100 illustrated in FIGS. 9A-9D may occur in any optical surface designed to have a smooth surface, and this degrades the quality of the optical component.

In view of the aforementioned problems, it is therefore an object of the invention to provide an optical component having no wrinkle on the optical path area of the optical surface, an injection molding die for the optical component, and an injection molding method for the optical component.

The present invention relates to an optical component 1, 40, 55, 75, and 82 that optically connects a photoelectric conversion element 5 and an optical transmission member 22. The optical component 1, 40, 55, 75, and 82 according to the present invention has an optical surface 13, 47, 65, and 76 arranged in a middle of an optical path between the photoelectric conversion element 5 and the optical transmission member 22 to reflect or transmit a light traveling along the optical path. In addition, the optical surface 13, 47, 65, and 76 has an optical path area 14, 48, 66, and 78 that reflects or transmits the light and a non-optical path area 15, 50, 67, and 80 other than the optical path area 14, 48, 66, and 78, and the optical path area and the non-optical path area are placed coplanarly. Furthermore, the optical path area 14, 48, 66, and 78 has a smooth surface, and at least a part of the non-optical path area 15, 50, 67, and 80 has a rough surface rougher than the optical path area 14, 48, 66, and 78.

The present invention relates to an optical component 83 that optically connects a first optical transmission member 84 and a second optical transmission member 85. The optical component 83 according to the present invention has an optical surface 47 arranged in a middle of an optical path between the first optical transmission member 84 and the second optical transmission member 85 to transmit a light traveling along the optical path. In addition, the optical surface 47 has an optical path area 48 that transmits the light and a non-optical path area 50 other than the optical path area 48, and the optical path area 48 and the non-optical path area 50 are placed coplanarly. Furthermore, the optical path area 48 has a smooth surface, and at least a part of the non-optical path area 50 has a rough surface rougher than the optical path area 48.

The present invention relates to an injection molding die 24 for an optical component 1 that optically connects a photoelectric conversion element 5 and an optical transmission member 22, the optical component having an optical surface 13 arranged in a middle of an optical path between the photoelectric conversion element 5 and the optical transmission member 22, the optical surface having an optical path area 14 that reflects or transmits a light traveling along the optical path and a non-optical path area 15 other than the optical path area 14, the optical path area 14 and the non-optical path area 15 being placed coplanarly. The injection molding die 24 for the optical component 1 according to the present invention has a cavity 28 configured to shape the optical component 1 and the cavity has an optical surface cavity inner face 33 that forms the optical surface 13. In addition, a portion of the optical surface cavity inner face 33 for shaping the optical path area 14 has a smooth surface, and a portion for shaping at least a part of the non-optical path area 15 has a rough surface rougher than the optical path area 14.

The present invention relates to an injection molding method for an optical component 1 that optically connects a photoelectric conversion element 5 and an optical transmission member 22, the optical component 1 having an optical surface 13 arranged in a middle of an optical path between the photoelectric conversion element 5 and the optical transmission member 22, the optical surface 13 having an optical path area 14 that reflects or transmits a light traveling along the optical path and a non-optical path area 15 other than the optical path area 14, the optical path area 14 and the non-optical path area 15 being placed coplanarly. In the injection molding method for the optical component 1 according to the present invention, the optical component 1 is formed by injecting molten resin into a cavity 28 of the injection molding die 24. In addition, a smooth surface of the optical surface cavity inner face 33 of the cavity 28 is transferred to the optical path area 14 of the optical surface 13. Moreover, a rough surface rougher than the smooth surface on the optical surface cavity inner face 33 of the cavity 28 is transferred to at least a part of the non-optical path area 15 of the optical surface 13.

According to the present invention, it is possible to provide an optical component having no wrinkle in the optical path area on the optical surface. As a result, according to the present invention, it is possible to reduce a fraction defective of the optical component and improve production efficiency.

DESCRIPTION OF EMBODIMENTS

Embodiments of the present invention will now be described with reference to the accompanying drawings.

Figure 1A:
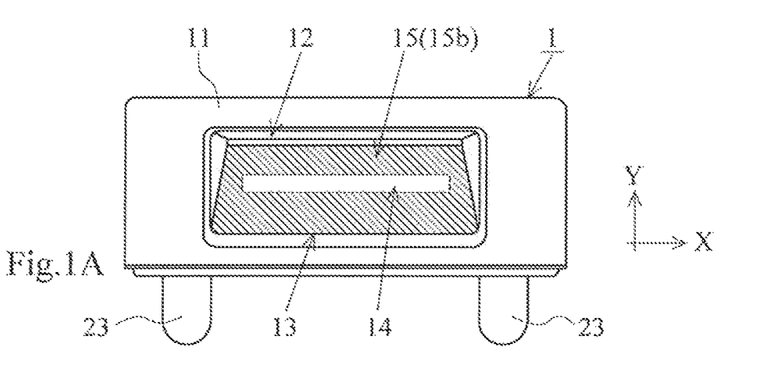
FIG. 1 is a diagram illustrating an optical receptacle (optical component) according to a first embodiment of the present invention.
Figure 1B:
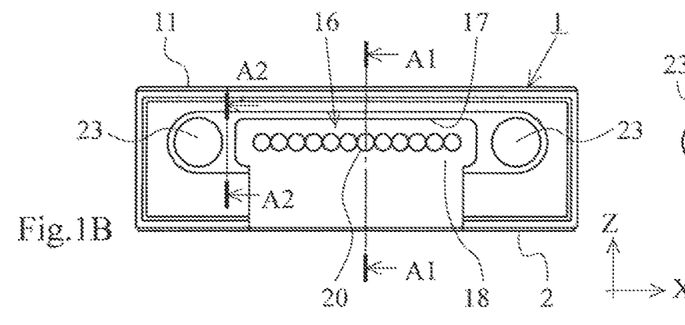
Figure 1C:
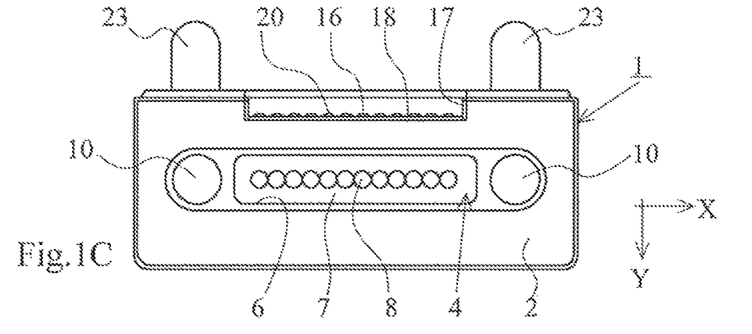
Figure 1D:
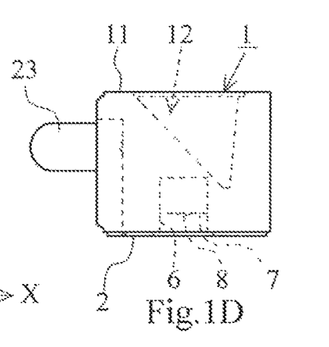
Figure 1E:
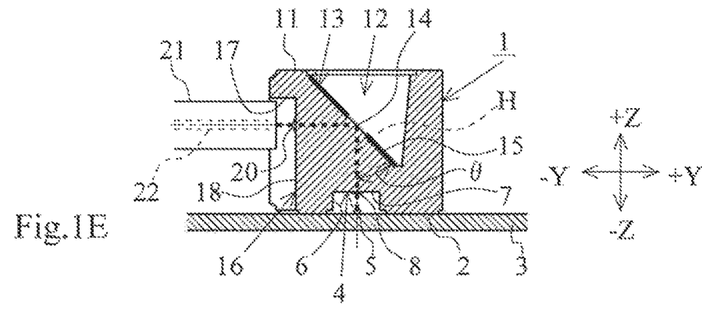
Figure 1F:
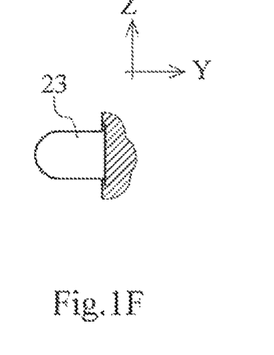

First Embodiment (Optical Receptacle)
FIGS. 1A-1F are diagrams illustrating an optical receptacle (optical component) 1 according to this embodiment. FIG. 1A is a plan view illustrating the optical receptacle 1, FIG. 1B is a front view illustrating the optical receptacle 1, FIG. 1C is a rear view illustrating the optical receptacle 1, and FIG. 1D is a right side view illustrating the optical receptacle 1. In addition, FIG. 1E illustrates the optical receptacle 1 of FIG. 1B by cutting along the line A1-A1, and also illustrates a use state of the optical receptacle 1. Furthermore, FIG. 1F is a partial cross-sectional view taken along the line A2-A2 of FIG. 1B to illustrate the optical receptacle 1.

As illustrated in FIGS. 1A-1F, the optical receptacle 1 is formed of an entirely light-transmissive resin material (for example, transparent resin such as polyether imide (PEI) or cyclic olefin resin) in a substantially rectangular parallelpiped shape and has a back face 2 mounted on a board 3 such that a first optical surface 4 formed on the back face 2 side faces a plurality of light-emitting elements (photoelectric conversion elements) 5 installed in the board 3. The first optical surface 4 is a bottom wall face of a concave portion 6 formed on the back face 2 of the optical receptacle 1. The first optical surface 4 has a smooth surface 7 parallel with the board 3 and a plurality of first convex lenses 8 protruding from the smooth surface 7 and facing a plurality of light-emitting elements 5 in a one-to-one relationship. In addition, the first convex lenses 8 of the first optical surface 4 are placed in an optical path of the light H emitted from the light-emitting element 5 so that the light H emitted from the light-emitting element 5 is incident to the inside of the optical receptacle 1 as a parallel light (to function as a collimate lens). Furthermore, the optical receptacle 1 has positioning recesses 10 formed in both sides of the longitudinal direction of the first optical surface 4 to be fitted to positioning protrusions (not shown) of the board 3 side in order to allow installation in a state positioned on the board 3. If the optical receptacle 1 formed in this manner is mounted on the board 3 while the positioning recesses 10 are fitted to the positioning protrusions of the board 3 side, the first convex lenses 8 are accurately positioned in the light-emitting elements 5.

The optical receptacle 1 has a substantially V-shaped cross-sectional groove 12 formed on an upper face 11 side (in the side positioned oppositely to the back face 2 when the back face 2 is mounted on the board 3). The groove 12 formed on the upper face 11 side of the optical receptacle 1 has a second optical surface 13 partially functioning as a reflection surface. The second optical surface 13 reflects the light H emitted from the light-emitting element 5 and incident to the inside of the optical receptacle 1 from the first convex lens 8 (in FIG. 1E, the light H traveling in a direction normal to the board 3 (+Z direction)) in parallel with the board 3 (−Y direction). The second optical surface 13 is a sloped surface formed at an inclination angle θ of 45° against a normal direction (+Z direction) of the board 3 and has a lower end side closer in the +Y direction relative to its upper end side, and a shape seen in a plan view has a profile of a substantially isosceles trapezoid (refer to FIG. 1A). Note that the inclination angle θ of the second optical surface 13 is not limited to "45°", but may be set to any angle by which the light H incident to the inside of the optical receptacle 1 is totally reflected to a desired direction.

Figure 2A:
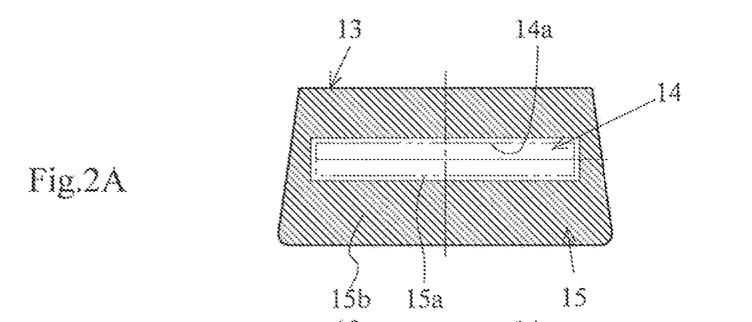
FIG. 2A is a plan view illustrating a second optical surface of the optical receptacle according to the first embodiment of the present invention.
Figure 2B:
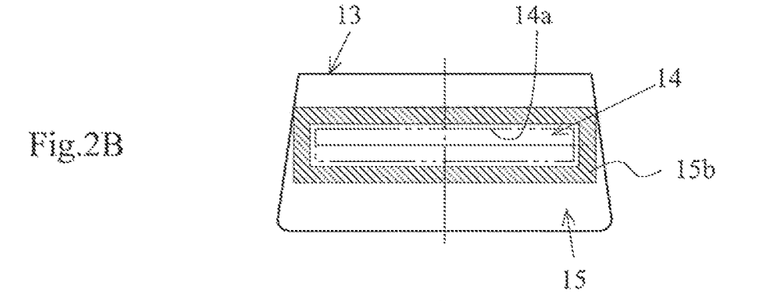
FIG. 2B is a diagram illustrating a first modification of the second optical surface.

As specifically illustrated in FIGS. 1A and 2B, the second optical surface 13 has an optical path area 14 formed by surrounding an area where the light H incident from the first convex lens 8 arrives with a rectangular virtual line 14a and a non-optical path area 15 other than the optical path area 14, and the optical path area 14 and the non-optical path area 15 are placed coplanarly. In addition, the optical path area 14 of the second optical surface 13 has a smooth surface (having a surface roughness Ra of 0.065 μm or lower) in order to reflect the light H with high accuracy. Furthermore, the area surrounding the optical path area 14 of the second optical surface 13 is the non-optical path area 15 that does not reflect the light H incident to the inside of the optical receptacle 1 from the first convex lens 8. The non-optical path area 15 has a smooth surface portion 15a that surrounds the optical path area 14 in a frame shape and a rough surface portion 15b (hatched part) placed to surround the smooth surface portion 15a. In addition, the smooth surface portion 15a of the non-optical path area 15 has a smooth surface (having a surface roughness Ra of 0.065 μm or lower) similar to the optical path area 14. Furthermore, the rough surface portion 15b of the non-optical path area 15 has a rough surface rougher than the optical path area 14 (for example, having a surface roughness Ra of 1.0 μm).

The optical receptacle 1 has a third optical surface 16 formed in the front side. The third optical surface 16 is placed on a bottom face of the hollow portion 17 formed in the front side of the optical receptacle 1. In addition, the third optical surface 16 has a smooth surface 18 formed in parallel with the X-Z coordinate plane and a plurality of second convex lenses 20 formed to protrude from the smooth surface 18. The second convex lenses 20 of the third optical surface 16 are formed to emit the light H incident from the first convex lens 8 to the inside of the optical receptacle 1 and the light H reflected on the second optical surface 13 to the outside of the optical receptacle 1 and are placed in the optical path area of the light H with the same number as that of the first convex lenses 8 to match the first convex lenses 8 in a one-to-one relationship. Furthermore, the second convex lenses 20 of the third optical surface 16 are placed to match optical fibers (photodetectors) 22 of a ferrule 21 installed in the front side of the optical receptacle 1 in a one-to-one relationship, so that the emitted light beams are condensed on the incident surface of the optical fiber 22.

The optical receptacle 1 has positioning protrusions 23 formed in both sides along the X-axis direction of the hollow portion 17 of the front side. A pair of positioning protrusions 23 of the optical receptacle 1 are provided to install the ferrule 21 in the optical receptacle 1 while the ferrule 21 is positioned.

The ferrule 21 has a pair of positioning holes (not shown) engaged with a pair of positioning protrusions 23 of the optical receptacle 1. In addition, as a pair of positioning holes of the ferrule 21 are engaged with a pair of positioning protrusions 23 of the optical receptacle 1, a plurality of optical fibers (optical transmission member) 22 are respectively positioned to face the second convex lenses 20 of the third optical surface 16 in a one-to-one relationship. As a result, the optical fiber 22 can accurately receive the light emitted from the second convex lenses 20 of the third optical surface 16. As a result, the light-emitting element 5 and the optical fiber 22 are optically connected to each other with the optical receptacle 1.

While the optical receptacle 1 has been described above by assuming that the light-emitting element 5 is a photoelectric conversion element, and the optical fiber 22 is an optical transmission member by way of example, the optical receptacle 1 may be used to input the light emitted from the optical fiber (optical transmission member) 22 from the second convex lens 20 to the inside, reflect the light incident from the second convex lens 20 to the first convex lens 8 with the second optical surface 13, and emit the light reflected on the second optical surface 13 from the first convex lens 8 to the photodetector (photoelectric conversion element) 5. In addition, an optical waveguide may be employed as the optical transmission member instead of the optical fiber 22. This may similarly apply to each of the following embodiments.

(Injection Molding Die for Optical Receptacle and Injection Molding Method)

Figure 3A:
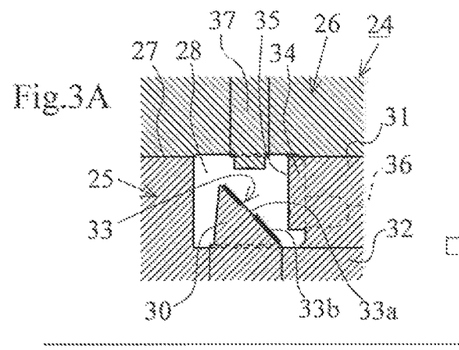
FIGS. 3A-3E are diagrams illustrating an injection molding die and an injection molding method for injection-molding the optical receptacle (optical component) according to the first embodiment of the present invention.

FIGS. 3A-3E are diagrams illustrating an injection molding die 24 for the optical receptacle 1 and an injection molding method. As illustrated in FIG. 3A, the injection molding die 24 has a cavity 28 for shaping the optical receptacle 1 on a die joint surface 27 side between a fixed die 25 and a movable die 26. The fixed die 25 has a second optical surface formation piece 30 for shaping a substantially V-shaped groove 12 of the optical receptacle 1 and a slidable piece 31 for forming a third optical surface 16 of the optical receptacle 1. The second optical surface formation piece 30 is fixed to a fixed die body 32, is formed in a substantially triangular prism shape, and has a sloped surface (optical surface cavity inner surface) 33 corresponding to the second optical surface 13. On the sloped surface 33 of the second optical surface formation piece 30, a part for forming the optical path area 14 of the second optical surface 13 and the smooth surface portion 15a of the non-optical path area 15 (smooth surface formation portion) 33a has a smooth surface (having a surface roughness Ra of 0.065 μm or lower), and a part for forming the rough surface portion 15b of the non-optical path area of the second optical surface 13 (rough surface formation portion) 33b has a rough surface rougher than the smooth surface formation portion 33a (for example, a surface having a surface roughness Ra of 1.0 μm). Note that the rough surface formation portion 33b of the second optical surface formation piece 30 has a surface having minute embossing formed through sand blasting, mechanical machining, or the like.

As illustrated in FIG. 3A, the slidable piece 31 is used to shape a front side of the optical receptacle 1 and is slidable against the fixed die body 32. In addition, the slidable piece 31 has a hollow formation portion 34 in the front side of the optical receptacle 1, a third optical surface formation portion 35, and a positioning protrusion formation hole 36.

As illustrated in FIG. 3A, a first optical surface formation piece 37 for forming the concave portion 6 of the back face 2 side of the optical receptacle 1 and the first optical surface 4 is fixed to the movable die 26.

FIGS. 3A to 3E illustrate the injection molding method for the optical receptacle 1 using the injection molding die 24 described above.

Figure 3B:
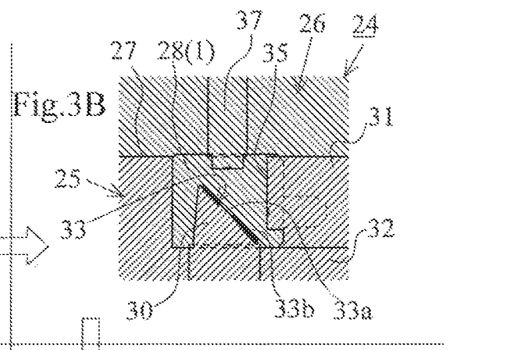
Figure 3C:
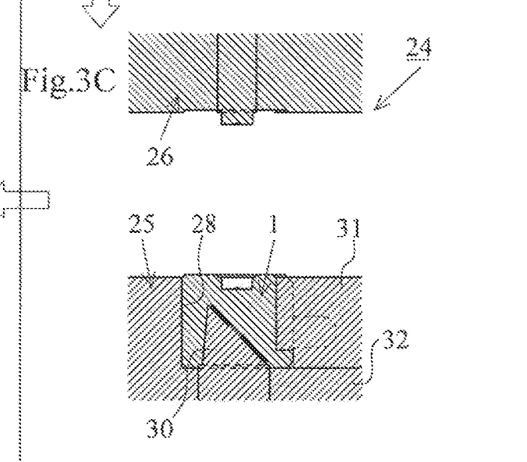
Figure 3D:
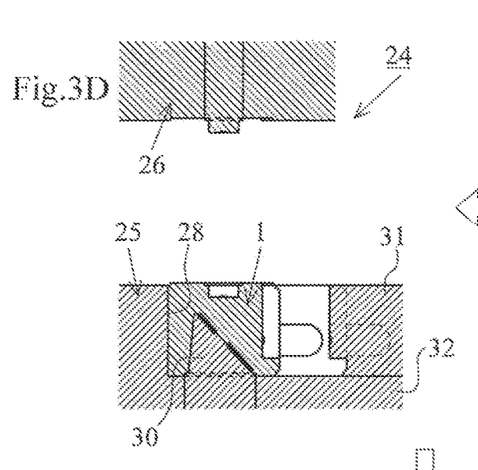
Figure 3E:
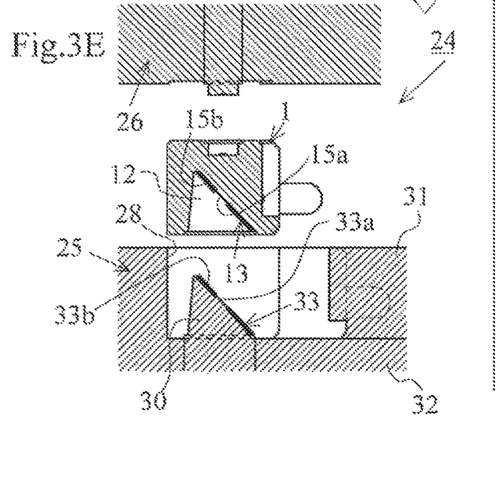

First, a first process of FIG. 3A is a casting process of the fixed die 25 and the movable die 26. Then, a second process of FIG. 3B is a process of injecting molten resin from a gate (not shown) to the inside of a cavity 28 formed in the die joint surface 27 side between the fixed die 25 and the movable die 26 and pressure-holding and cooling the molten resin injected to the inside of the cavity 28. In the second process, the smooth surface formation portion 33a and the rough surface formation portion 33b of the sloped surface 33 of the second optical surface formation piece 30 are transferred to the optical receptacle 1 as an injection molding product. Then, a third process of FIG. 3C is a process of separating the movable die 26 from the fixed die 25. Then, a fourth process of FIG. 3D is a process of sliding the slidable piece 31 to the right direction of the drawing with respect to the fixed die body 32 to retreat the slidable piece 31 from the optical receptacle 1 as an injection molding product inside the cavity 28. Then, a fifth process of FIG. 3E is a process of extruding the optical receptacle 1 from the cavity 28 of the fixed die 25 using an ejector pin (not shown).

In the injection molding die 24 described above, the rough surface formation portion 33b for shaping the rough surface portion 15b of the second optical surface 13 of the optical receptacle 1 is provided on the sloped surface 33 of the second optical surface formation piece 30 for forming the second optical surface 13 of the optical receptacle 1. Therefore, when the optical receptacle 1 is extruded from the cavity 28 in the fifth process, an adhesion force between the second optical surface 13 of the optical receptacle 1 formed of a resin material and the sloped surface 33 of the second optical surface formation piece 30 becomes smaller than the adhesion force between the second optical surface 103 of the optical receptacle 100 and the surface 116 of the second optical surface formation piece 115 in the case of the injection molding die 110 of the prior art. As a result, in the optical receptacle 1 injection-molded using the injection molding die 24 according to the present invention, a wrinkle caused by the injection molding is not generated on the second optical surface 13. In addition, since the optical receptacle 1 has a plurality of first convex lenses 8 formed on the first optical surface 4 and a plurality of second convex lenses 20 formed on the third optical surface 16, the first convex lens 8 of the first optical surface 4 and the second convex lens 20 of the third optical surface 16 function similarly to the rough surface portion 15b of the second optical surface 13. Therefore, an adhesion force between the first optical surface 4 and the third optical surface 16, and the inner surface of the cavity 28 is reduced, and a wrinkle caused by the injection molding is not generated on the first optical surface 4 and the third optical surface 16.

As described above, in the optical receptacle 1 injection-molded using the injection molding die 24 according to this embodiment, since a wrinkle caused by injection molding is not generated on the second optical surface 13, occurrence of a molding failure during mold releasing is suppressed. As a result, using the optical receptacle 1 according to this embodiment, it is possible to reduce a fraction defective caused by the injection molding and improve production efficiency.

(First Modification of Second Optical Surface)

FIG. 2B is a diagram illustrating a first modification of the second optical surface 13. As illustrated in FIG. 2B, on the second optical surface 13, a part of the non-optical path area 15 that surrounds the optical path area 14 (a part that surrounds the optical path area in a frame shape) may have a rough surface portion 15b rougher than the optical path area (hatched part) as long as a wrinkle caused by injection molding is not generated on the optical path area 14.

(Second Modification of Second Optical Surface)

Figure 2C:
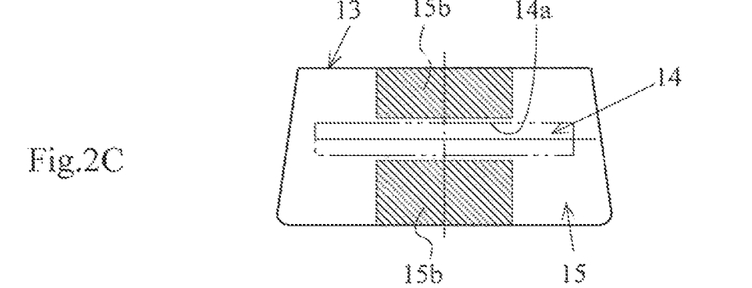
FIG. 2C is a diagram illustrating a second modification of the second optical surface.

FIG. 2C is a diagram illustrating a second modification of the second optical surface 13. As illustrated in FIG. 2C, on the second optical surface 13, a part of the non-optical path area 15 that surrounds the optical path area 14 (a plurality of portions) may have rough surface portions 15b (hatched parts) rougher than the optical path area 14 as long as a wrinkle caused by injection molding is not generated on the optical path area 14.

(Third Modification of Second Optical Surface)

Figure 2D:
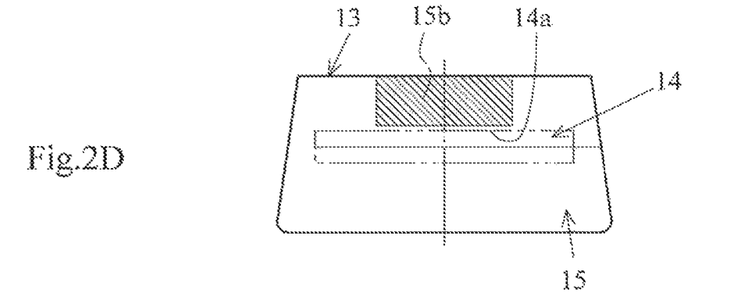
FIG. 2D is a diagram illustrating a third modification of the second optical surface.

FIG. 2D is a diagram illustrating a third modification of the second optical surface 13. As illustrated in FIG. 2D, on the second optical surface 13, a part of the non-optical path area 15 that surrounds the optical path area 14 (one portion) may have a rough surface portion 15b (hatched part) rougher than the optical path area 14 as long as a wrinkle caused by injection molding is not generated on the optical path area 14.

(Fourth Modification of Second Optical Surface)

In FIG. 2A, on the second optical surface 13, the entire non-optical path area 15 may have a rough surface portion 15b rougher than the optical path area 14.

Second Embodiment

Figure 4A:
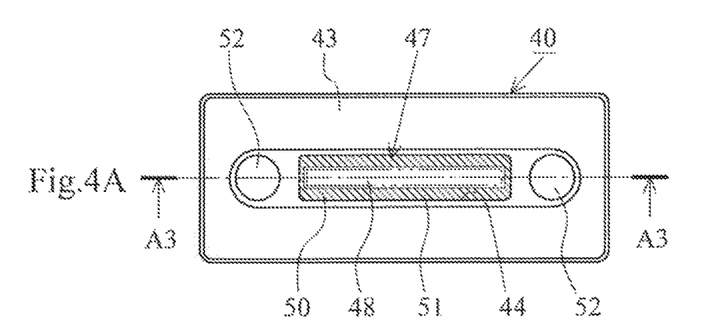
FIGS. 4A-4E are diagrams illustrating an optical receptacle (optical component) according to a second embodiment of the present invention.
Figure 4B:
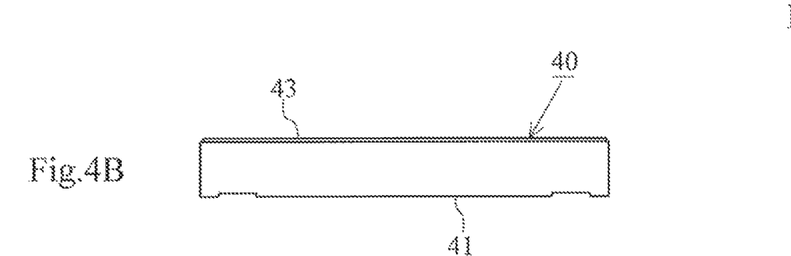
Figure 4C:
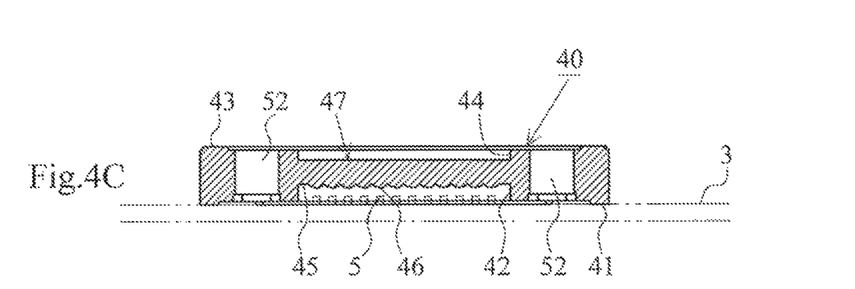
Figure 4D:
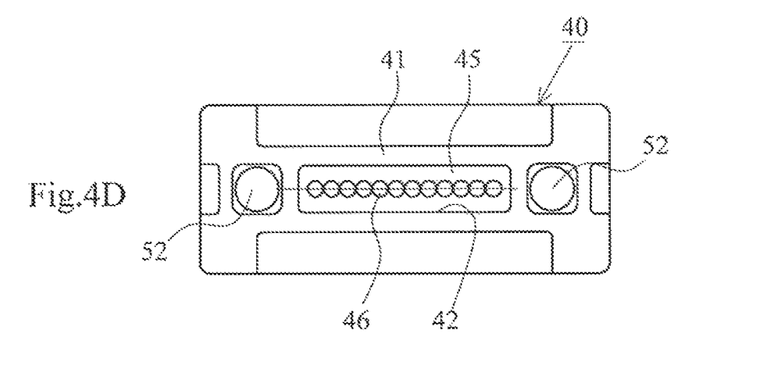
Figure 4E:
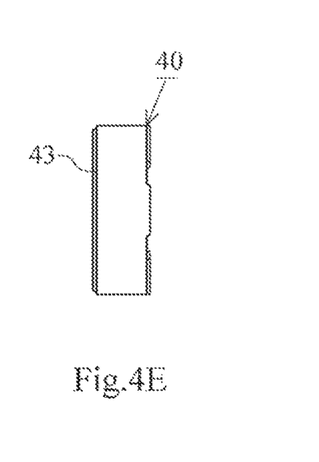

FIGS. 4A-4E are diagrams illustrating an optical receptacle (optical component) 40 according to a second embodiment of the present invention. FIG. 4A is a plan view illustrating the optical receptacle 40, FIG. 4B is a front view illustrating the optical receptacle 40, FIG. 4C is a cross-sectional view taken along the line A3-A3 of FIG. 4A to illustrate the optical receptacle 40, FIG. 4D is a rear view illustrating the optical receptacle 40, and FIG. 4E is a right side view illustrating the optical receptacle 40. Note that the optical receptacle 40 according to this embodiment is injection-molded using a resin material similar to that of the optical receptacle 1 of the first embodiment.

The optical receptacle 40 is a plate-shaped body having a rectangular shape as seen in a plan view, and is mounted while the back face 41 side is positioned on the board 3 installed with a plurality of light-emitting elements (photoelectric conversion elements) 5. In addition, the optical receptacle 40 has a first concave portion 42 formed on the back face 41 side and a second concave portion 44 formed on the upper face 43 side (opposite to the back face 41). The first concave portion 42 is a bottomed groove having a rectangular shape as seen from a direction normal to the back face 41. In addition, a bottom face of the first concave portion 42 has a first optical surface 45 parallel with the upper face of the board 3 and has a plurality of convex lenses 46 formed to face a plurality of light-emitting elements 5 of the board 3 in a one-to-one relationship. The convex lenses 46 of the first optical surface 45 function as collimate lenses to input the light from the light-emitting elements 5 to the inside of the optical receptacle 40 as a parallel light.

The optical receptacle 40 is a bottomed groove having a second concave portion 44 of the upper face 43 side formed coplanarly with the first concave portion 42 and opened to the upper side. In addition, the bottom face of the second concave portion 44 is a second optical surface 47 parallel with the upper face of the board 3, and an optical path area 48 where the light incident from a plurality of convex lenses 46 of the first optical surface 45 transmits is formed as a smooth surface (having a surface roughness Ra of 0.065 μm or lower). In addition, at least a part of the non-optical path area 50 that surrounds the optical path area 48 of the second optical surface 47 has a rough surface portion 51 (hatched part) rougher than the optical path area 48. The light transmitting through the optical path area 48 of the second optical surface 47 is incident to the optical fiber (optical transmission member) (not shown) arranged in the upper face 43 side, and the light-emitting element 5 and the optical fiber (not shown) are optically connected to each other with the optical receptacle 40. Note that the rough surface portion 51 has, for example, a surface roughness Ra of 1.0 μm.

The optical receptacle 40 according to this embodiment has a pair of positioning holes 52 penetrating the front and back faces. As the positioning protrusions (not shown) of the board 3 side are engaged with this pair of positioning holes 52, a plurality of convex lenses 46 can be positioned to face a plurality of light-emitting elements 5 on the board 3 in a one-to-one relationship.

In an injection molding die for injection-molding the optical receptacle 40 according to this embodiment, the optical surface cavity inner face for shaping parts other than the rough surface portion 51 of the second optical surface 47 has a smooth surface, and the optical surface cavity inner face for shaping the rough surface portion 51 of the second optical surface 47 has a rough surface (rougher than the smooth surface). As a result, the rough surface of the optical surface cavity inner face is transferred to the second optical surface 47 of the optical receptacle 40 as an injection molding product to form the rough surface portion 51, and the smooth surface of the optical surface cavity inner face is transferred to the part other than the rough surface portion 51 to form the smooth surface 50.

In the optical receptacle 40 according to this embodiment, a wrinkle caused by injection molding is not generated in the optical path area 48 of the second optical surface 47 as well as on the convex lens 46 of the first optical surface 45. As a result, using the optical receptacle 40 according to this embodiment, it is possible to obtain the effects similar to those of the optical receptacle 1 of the first embodiment.

Third Embodiment

Figure 5A:
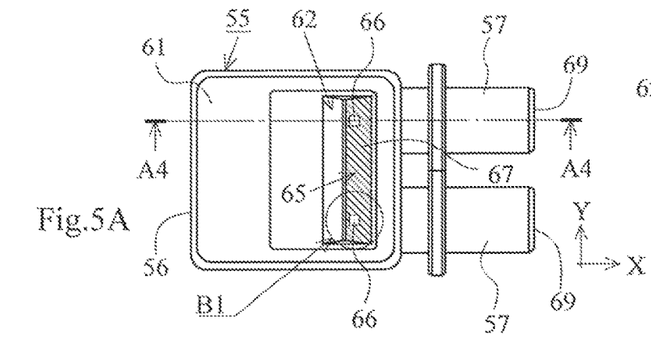
FIGS. 5A-5G are diagrams illustrating an optical receptacle (optical component) according to a third embodiment of the present invention.
Figure 5B:
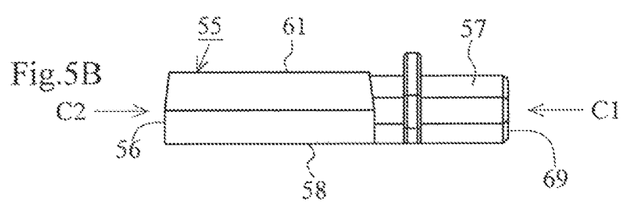
Figures 5C, 5D, 5G:
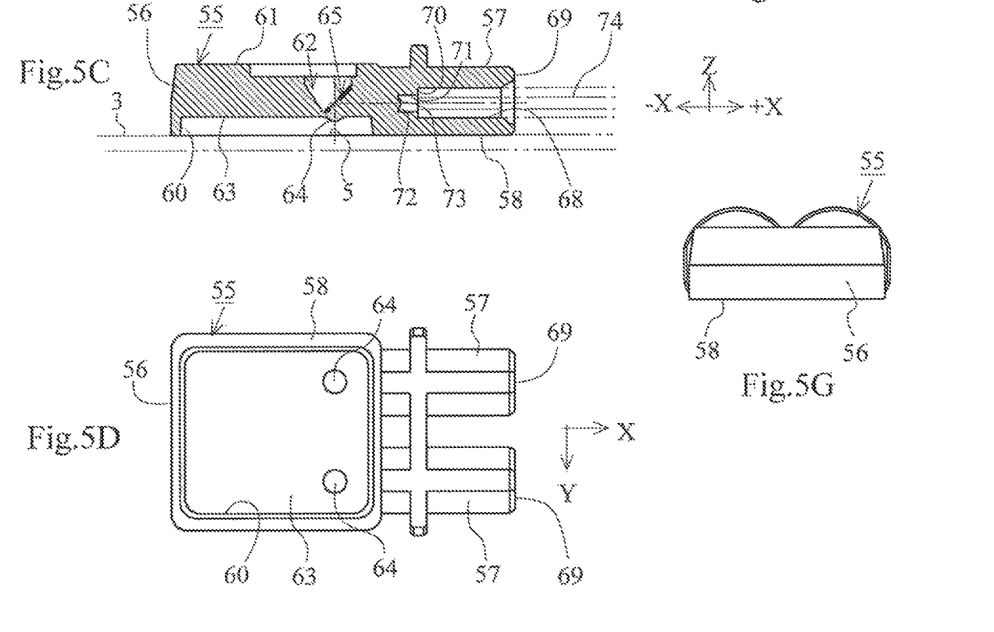
Figure 5E:
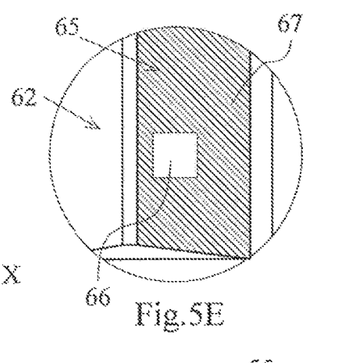
Figure 5F:
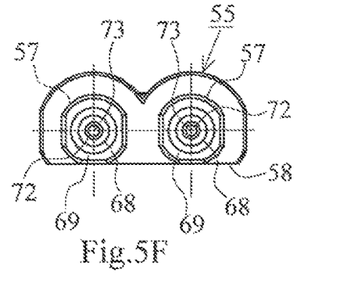

FIGS. 5A-5G are diagrams illustrating an optical receptacle (optical component) 55 according to this embodiment. FIG. 5A is a plan view illustrating the optical receptacle 55, FIG. 5B is a front view illustrating the optical receptacle 55, FIG. 5C is a cross-sectional view taken along the line A4-A4 of FIG. 5A to illustrate the optical receptacle 55, FIG. 5D is a rear view illustrating the optical receptacle 55, FIG. 5E is an enlarged view illustrating the portion B1 of FIG. 5A, FIG. 5F is a right side view illustrating the optical receptacle 55 (as seen from the arrow direction C1 of FIG. 5B), and FIG. 5G is a left side view illustrating the optical receptacle 55 (as seen from the arrow direction C2 of FIG. 5B). Note that the optical receptacle 55 according to this embodiment is injection-molded using a resin material similar to that of the optical receptacle 1 of the first embodiment.

The optical receptacle 55 of FIGS. 5A-5G has an optical receptacle body 56 as a plate-shaped body having a rectangular shape as seen in a plan view and a pair of ferrule supports 57 provided along the Y-axis direction on the right side face of the optical receptacle body 56, the optical receptacle body 56 and the ferrule supports 57 being integrated with each other. In addition, the optical receptacle 55 is mounted while the back face 58 side is positioned on the board 3 installed with a pair of light-emitting elements (photoelectric conversion elements) 5. Furthermore, the optical receptacle 55 has a first concave portion 60 formed in the back face 58 side. Moreover, a groove 62 having a substantially V-shaped cross section is provided in the upper face 61 side of the optical receptacle 55 (opposite to the back face 58).

The first concave portion 60 is a bottomed groove having a rectangular shape as seen from a direction normal to the back face 58. In addition, the bottom face of the first concave portion 60 has a first optical surface 63 parallel with the upper face of the board 3, and a pair of first convex lenses 64 are formed along the Y-axis direction to face a pair of light-emitting elements 5 of the board 3 in a one-to-one relationship (refer to FIG. 5D). The first convex lenses 64 of the first optical surface 63 function as collimate lenses, so that the light from the light-emitting elements 5 of the board 3 is incident to the inside of the optical receptacle 55 as a parallel light.

The groove 62 provided in the upper face 61 side of the optical receptacle 55 corresponds to the groove 12 of the optical receptacle 1 of the first embodiment and has a second optical surface 65 partially functioning as a reflection surface. The second optical surface 65 reflects the light emitted from the light-emitting element 5 and incident to the inside of the optical receptacle 55 from the first convex lens 64 (in FIG. 5C, the light traveling in a direction normal to the board (Z direction)) in parallel with the board 3 (+X direction).

As specifically illustrated in FIGS. 5A and 5E, an optical path area 66 that reflects the light incident from the first convex lens 64 and a non-optical path area 67 (hatched part) other than this optical path area 66 are provided coplanarly on the second optical surface 65. In addition, the second optical surface 65 has a pair of optical path areas 66 matching the first convex lenses 64 to provide a smooth surface (having a surface roughness Ra of 0.065 μm or lower). Furthermore, the area surrounding the optical path area 66 on the second optical surface 65 is the non-optical path area 67 that does not reflect the light incident to the inside of the optical receptacle 55 from the first convex lens 64, and at least a part of the non-optical path area 67 has a rough surface rougher than the optical path area 66 (for example, having a surface roughness Ra of 1.0 μm). Note that a part not roughened in the non-optical path area 67 is the smooth surface similar to that of the optical path area 66.

As illustrated in FIG. 5C, the ferrule support 57 has a bottomed ferrule fitting hole 68 extending in the −X direction from a leading end face 69 and a bottomed small hole 71 provided on a bottom face 70 of the ferrule fitting hole 68.

In addition, the bottom face of the small hole 71 is a third optical surface 72 provided in parallel with the Z-Y coordinate plane, and a second convex lens 73 is provided in the center of the third optical surface 72. The second convex lens 73 emits, to the outside of the optical receptacle 55, the light incident to the inside of the optical receptacle 55 from the first convex lens 64 and reflected on the optical path area 66 of the second optical surface 65, and is positioned in the optical path of the light to match the first convex lens 64 in a one-to-one relationship to condense the emitted light on the end face of the optical fiber 74. In this manner, the optical receptacle 55 according to this embodiment optically connects the light-emitting element 5 and the optical fiber (optical transmission member) 74 to each other.

In the injection molding die for injection-molding the optical receptacle 55 according to this embodiment, a part of the optical surface cavity inner face for shaping the optical path area 66 of the second optical surface 65 has a smooth surface (having a surface roughness Ra of 0.065 µm or lower), and a part for shaping the rough surface of the non-optical path area 67 of the second optical surface 65 has a rough surface rougher than the part for shaping the optical path area 66 (for example, having a surface roughness Ra of 1.0 µm). In addition, a part of the optical surface cavity inner face for shaping the smooth surface of the non-optical path area 67 of the second optical surface 65 is similar to the part for shaping the optical path area 66. As a result, the optical surface cavity inner face is transferred to the second optical surface 65 of the optical receptacle 55 as an injection molding product to form the smooth surface of the optical path area 66, the smooth surface of the non-optical path area 67, and the rough surface of the non-optical path area 67.

In the optical receptacle 55 according to this embodiment described above, a wrinkle caused by injection molding is not generated in the first convex lens 64 of the first optical surface 63 and the second convex lens 73 of the third optical surface 72. In addition, a wrinkle caused by injection molding is not generated in the optical path area 66 of the second optical surface 65 when the optical receptacle 55 is separated from the optical surface cavity inner face of the injection molding die. As a result, using the optical receptacle 55 according to this embodiment, it is possible to obtain the effects similar to those of the optical receptacle 1 of the first embodiment.

Fourth Embodiment

Figure 6A:
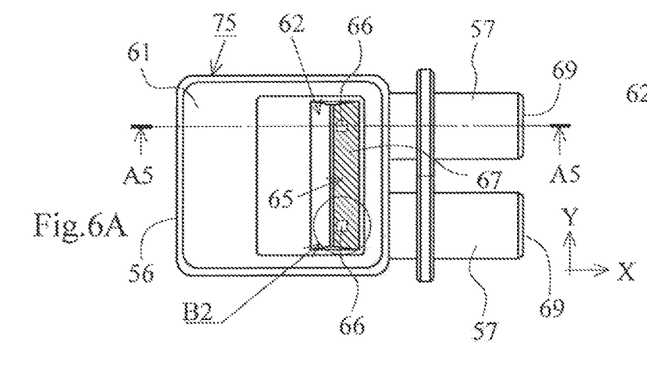
FIGS. 6A-6G are diagrams illustrating an optical receptacle (optical component) according to a fourth embodiment of the present invention.
Figures 6B, 6C, 6D, 6F, 6G:
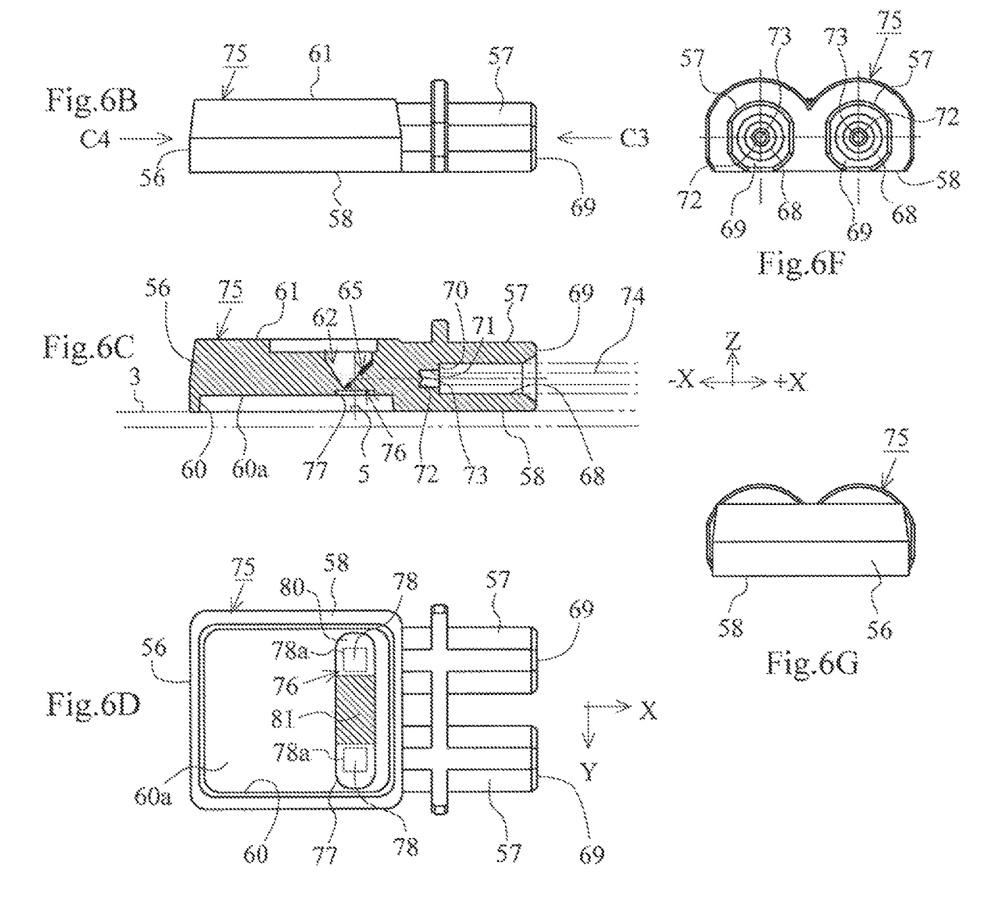
Figure 6E:
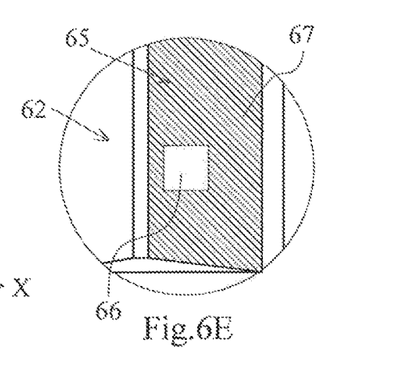

FIGS. 6A-6G are diagrams illustrating an optical receptacle (optical component) 75 according to this embodiment. FIG. 6A is a plan view illustrating the optical receptacle 75, FIG. 6B is a front view illustrating the optical receptacle 75, FIG. 6C is a cross-sectional view taken along the line A5-A5 of FIG. 6A to illustrate the optical receptacle 75, FIG. 6D is a rear view illustrating the optical receptacle 75, FIG. 6E is an enlarged view illustrating a portion B2 of FIG. 6A, FIG. 6F is a right side view illustrating the optical receptacle 75 (as seen from the arrow direction C3 of FIG. 6B), and FIG. 6G is a left side view illustrating the optical receptacle 75 (as seen from the arrow direction C4 of FIG. 6B). Note that the optical receptacle 75 according to this embodiment has a first optical surface 76 different from that of the optical receptacle 55 of the third embodiment, and other elements are similar to those of the optical receptacle 55 of the third embodiment. Therefore, in description of the optical receptacle 75 according to this embodiment, like reference numerals denote like elements as in the optical receptacle 55 of the third embodiment, and they will not be described repeatedly.

In addition, it is assumed that the optical receptacle 75 according to this embodiment is injection-molded using a resin material similar to that of the optical receptacle 1 of the first embodiment.

As illustrated in FIGS. 6A-6G, the optical receptacle 75 according to this embodiment has a first concave portion 60 provided in the back face 58 side and a bottomed groove 77 provided on a bottom face 60a of the first concave portion 60 (particularly, refer to FIGS. 6C and 6D). This bottomed groove 77 is a slot provided along the Y-axis direction on the bottom face 60a of the first concave portion 60 and has a groove bottom face provided in parallel with the X-Y coordinate plane to serve as the first optical surface 76. The first optical surface 76 has a pair of optical path areas 78 (surrounded by a rectangular frame 78a) where the light emitted from a pair of light-emitting elements (photoelectric conversion elements) 5 on the board 3 passes when it is incident to the inside of the optical receptacle 75, and a non-optical path area 80 other than the optical path area 78. In addition, a part of the first optical surface 76 other than a center non-optical path area portion 81 between a pair of optical path areas 78 (the part hatched in the non-optical path area 80) has a smooth surface (having a surface roughness Ra of 0.065 µm or lower), and the center non-optical path area portion 81 has a rough surface (rougher than the smooth surface, for example, with a surface roughness Ra of 1.0 µm). The optical receptacle 75 according to this embodiment optically connects the light-emitting element 5 and the optical fiber (optical transmission member) 74 to each other.

In the injection molding die for injection-molding the optical receptacle 75 according to this embodiment, the optical surface cavity inner face for shaping the first optical surface 76 is divided into a center non-optical path area portion 81 and a part other than the center non-optical path area portion 81. In addition, out of the optical surface cavity inner face for shaping the first optical surface 76, a part of the optical surface cavity inner face for shaping the part other than the center non-optical path area portion 81 has a smooth surface (having a surface roughness Ra of 0.065 µm or lower), and a part of the optical surface cavity inner face for shaping the center non-optical path area portion 81 has a rough surface (rougher than the smooth surface, for example, with a surface roughness Ra of 1.0 µm). As a result, the smooth surface on the optical surface cavity inner face is transferred to a part of the non-optical path area 80 other than the center non-optical path area portion 81 on the first optical surface 76 of the optical receptacle 75 as an injection molding product. In addition, the rough surface on the optical surface cavity inner face is transferred to the center non-optical path area portion 81.

In the injection molding die for injection-molding the optical receptacle 75 according to this embodiment, the optical surface cavity inner face for shaping the second optical surface 65 has a configuration similar to that of the optical surface cavity inner face for shaping the second optical surface 65 of the optical receptacle 55 of the third embodiment.

In the optical receptacle 75 according to this embodiment described above, a wrinkle caused by injection molding is not generated in the optical path area 78 of the first optical surface 76 and the optical path area 66 of the second optical surface 65 as well as in the convex lens 73 of the third optical surface 72 (in a part corresponding to the second convex lens 73 of the optical receptacle 55 of the third embodiment). As a result, using the optical receptacle 75 according to this embodiment, it is possible to obtain the effects similar to those of the optical receptacle 1 of the first embodiment.

Fifth Embodiment

Figure 7A:
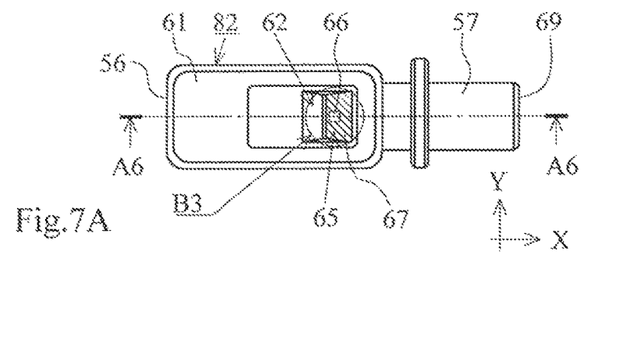
FIGS. 7A-7G are diagrams illustrating an optical receptacle (optical component) according to a fifth embodiment of the present invention.
Figure 7B:
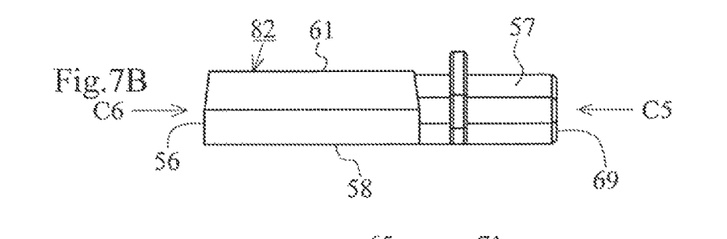
Figure 7C:
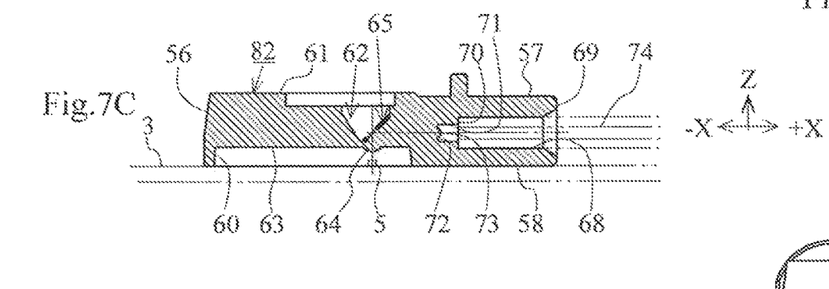
Figure 7D:
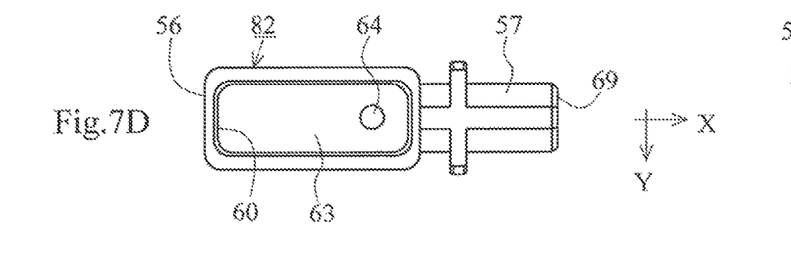
Figure 7E:
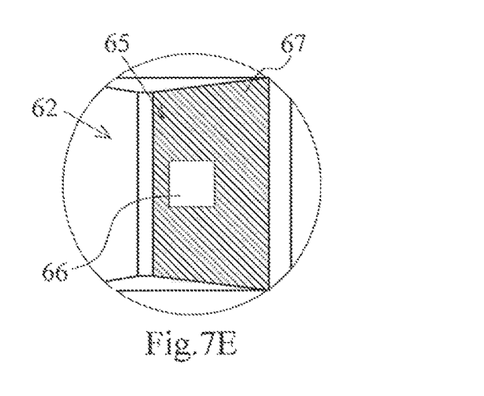
Figure 7F:
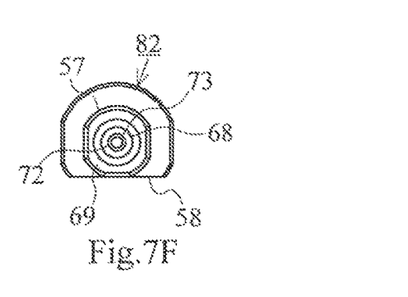
Figure 7G:
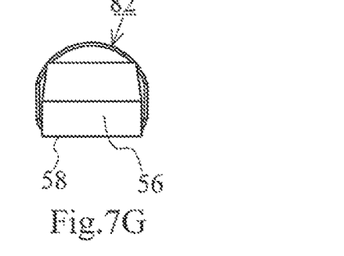

FIGS. 7A-7G are diagrams illustrating an optical receptacle (optical component) 82 according to this embodiment. FIG. 7A is a plan view illustrating the optical receptacle 82, FIG. 7B is a front view illustrating the optical receptacle 82, FIG. 7C is a cross-sectional view taken along the line A6-A6 of FIG. 7A to illustrate the optical receptacle 82, FIG. 7D is a rear view illustrating the optical receptacle 82, FIG. 7E is an enlarged view illustrating the portion B3 of FIG. 7A, FIG. 7F is a right side view illustrating the optical receptacle 82 (as seen from the arrow direction C5 of FIG. 7B), and FIG. 7G is a left side view illustrating the optical receptacle 82 (as seen from the arrow direction C6 of FIG. 7B). Note that the optical receptacle 82 according to this embodiment has a single first convex lens 64, a single second convex lens 73, and a single ferrule support 57 to match the single light-emitting element (photoelectric conversion element) 5 on the board 3, and has a structure obtained by bisecting the optical receptacle 55 of the third embodiment of FIG. 5A along a virtual straight line extending in the X-axis direction. Therefore, in the description of the optical receptacle 82 according to this embodiment, like reference numerals denote like elements as in the optical receptacle 55 of the third embodiment, and they will not be described repeatedly.

The groove 62 provided in the upper face 61 side of the optical receptacle 82 has a second optical surface 65 partially functioning as a reflectance surface. The second optical surface 65 reflects, in parallel with the board 3 (+X direction), the light emitted from the light-emitting element 5 and incident to the inside of the optical receptacle 82 from the first convex lens 64 (in FIG. 7C, the light traveling in a direction normal to the board 3 (Z direction)).

As specifically illustrated in FIGS. 7A and 7C, the second optical surface 65 has an optical path area 66 that reflects the light incident from the first convex lens 64 and a non-optical path area 67 other than this optical path area 66, and the optical path area 66 and the non-optical path area 67 are placed coplanarly. In addition, the optical path area 66 of the second optical surface 65 is provided to match the first convex lens 64 and has a smooth surface (having a surface roughness Ra of 0.065 μm or lower) in order to reflect the light with high accuracy. Furthermore, a portion surrounding the optical path area 66 of the second optical surface 65 (hatched part) is the non-optical path area 67 that does not reflect the light incident to the inside of the optical receptacle 82 from the first convex lens 64. Moreover, at least a part of the non-optical path area 67 has a rough surface rougher than the optical path area 66 (for example, having a surface roughness Ra of 1.0 μm). The optical receptacle 82 according to this embodiment optically connects the light-emitting element 5 and the optical fiber (optical transmission member) 74 to each other.

In the injection molding die for injection-molding the optical receptacle 82 according to this embodiment, a part of the optical surface cavity inner face for shaping the smooth surface of the second optical surface 65 has a smooth surface (having a surface roughness Ra of 0.065 μm or lower), and a part for shaping the rough surface of the second optical surface 65 has a rough surface (for example, having a surface roughness Ra of 1.0 μm). As a result, the smooth surface on the optical surface cavity inner face is transferred to the optical path area 66, and the rough surface on the optical surface cavity inner face is transferred to at least a part of the non-optical path area 67 on the second optical surface 65 of the optical receptacle 82 as an injection molding product.

In the optical receptacle 82 according to this embodiment described above, a wrinkle caused by injection molding is not generated in the optical path area 66 of the second optical surface 65 as well as in the first convex lens 64 of the first optical surface 63 and the second convex lens 73 of the third optical surface 72. As a result, using the optical receptacle 82 according to this embodiment, it is possible to obtain the effects similar to those of the optical receptacle 1 of the first embodiment.

Sixth Embodiment

Figure 8A:
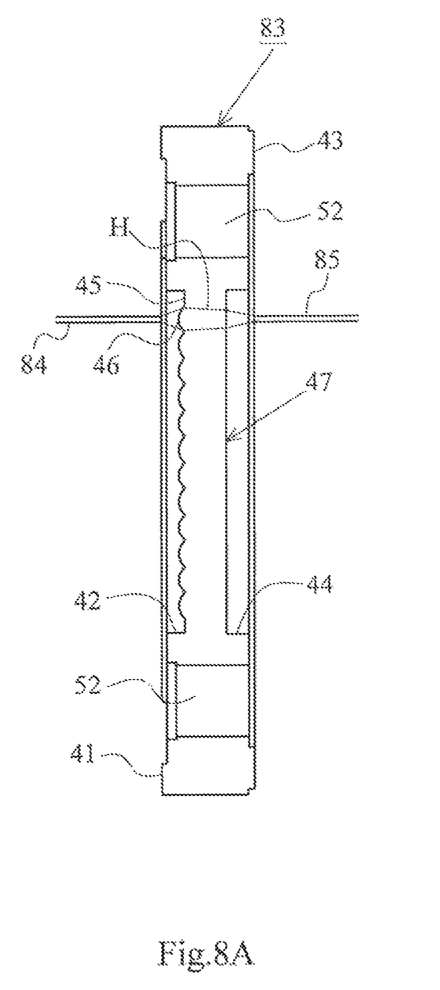
FIGS. 8A and 8B are diagrams illustrating an optical receptacle (optical component) according to a sixth embodiment of the present invention.
Figure 8B:
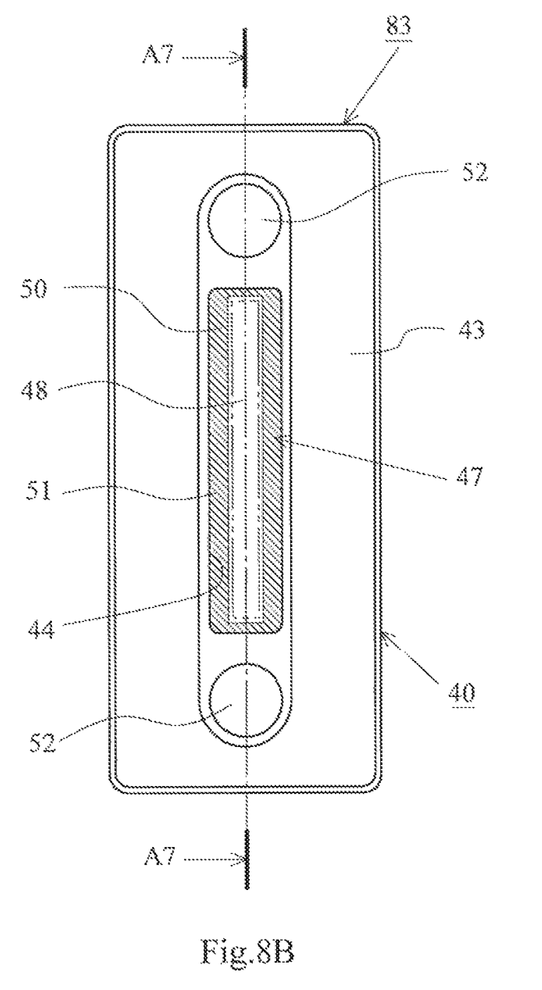
Figure 9A:
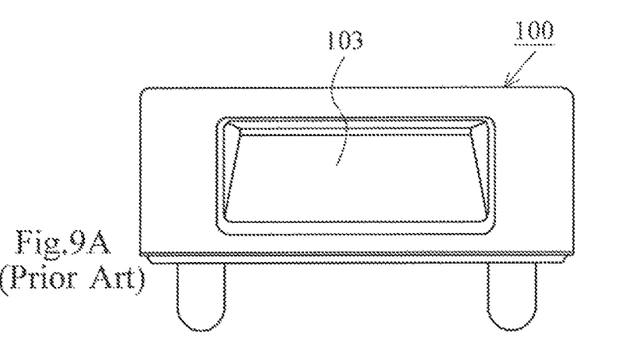
FIG. 9A is a plan view illustrating the optical receptacle.
Figure 9B:
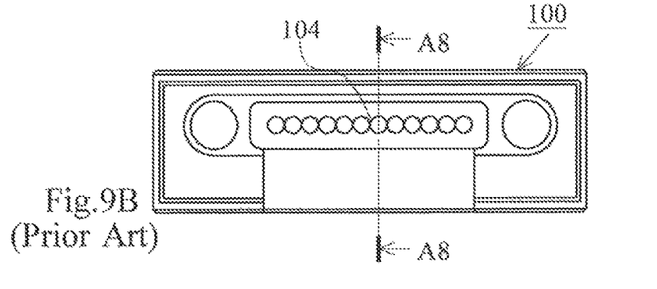
FIG. 9B is a front view illustrating the optical receptacle.
Figure 9C:
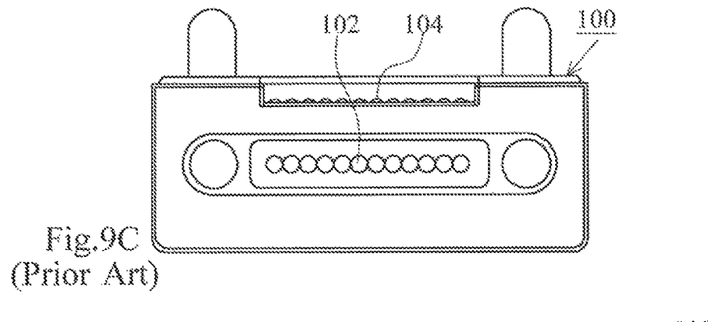
FIG. 9C is a rear view illustrating the optical receptacle.
Figure 9D:
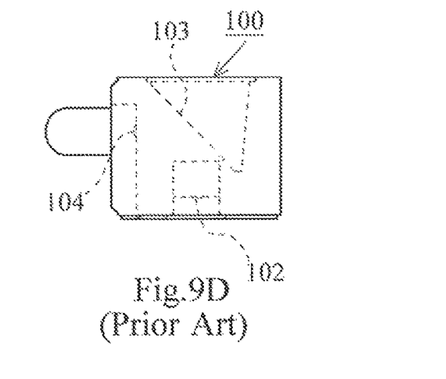
FIG. 9D is a right side view illustrating the optical receptacle.
Figure 9E:
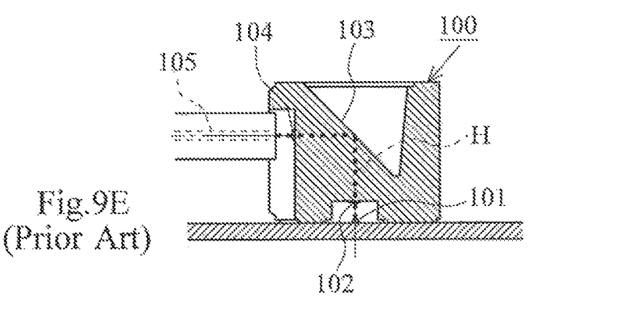
FIG. 9E is a cross-sectional view taken along the line A8-A8 of FIG. 9B to illustrate the optical receptacle.

FIGS. 8A and 8B are diagrams illustrating an optical receptacle (optical component) 83 according to a sixth embodiment of the present invention. Note that FIG. 8A is a vertical cross-sectional view illustrating the optical receptacle 83 (taken along the line A7-A7 of FIG. 8B without hatching), and FIG. 8B is a plan view illustrating the optical receptacle 83 (as a top view).

In the optical receptacle 83 according to this embodiment, the configuration of the optical receptacle 40 according to the second embodiment is partially changed. Instead of the light-emitting element (photoelectric conversion element) 5 of the optical receptacle 40 of the second embodiment, a first optical fiber (first optical transmission member) 84 is employed (refer to FIG. 4C). Note that, in the description of the optical receptacle 83 according to this embodiment illustrated in FIGS. 8A and 8B, like reference numerals denote like elements as in the optical receptacle 40 of the second embodiment, and they will not be described repeatedly.

As illustrated in FIGS. 8A and 8B, in the optical receptacle 83 according to this embodiment, the light H emitted and widened from the first optical fiber (first optical transmission member) 84 of the back face 41 side is condensed and incident to the inside using the convex lens 46 of the first optical surface 45, and the light H incident to the inside is further condensed when it is emitted from the optical path area 48 of the second optical surface 47, so that the light H emitted from the optical path area 48 of the second optical surface 47 is incident to the second optical fiber (second transmission member) 85 arranged in the upper face 43 side. In this manner, the optical receptacle 83 according to this embodiment optically connects the first optical fiber 84 and the second optical fiber 85 to each other.

Similar to the optical receptacle 40 of the second embodiment, in the optical receptacle 83 according to this embodiment, the optical path area 48 of the second optical surface 47 has a smooth surface, and at least a part of the non-optical path area 50 of the second optical surface 47 is a rough surface portion 51. Therefore, it is possible to obtain the effects similar to those of the optical receptacle 40 of the second embodiment. Note that, although the optical receptacle 83 according to this embodiment has been described using the terminologies used for the back face 41 side and the upper face 43 side for comparison with the optical receptacle 40 of the second embodiment, the back face 41 side may be referred to as one of lateral face sides, and the upper face 43 side may be referred to as the other lateral face side without limiting thereto.

Other Embodiments

Although the optical receptacles 1, 40, 55, 75, 82, and 83 according to each of the aforementioned embodiments have rectangular optical path areas 14, 48, 66, and 78, the optical path areas may have a shape (such as a round shape or an elliptical shape) suitable for light beams on a virtual cross section perpendicular to the light traveling direction without limiting thereto.

The surface roughness values (Ra) are exemplified in each of the aforementioned embodiments for easy understanding purposes, and they may be suitably determined depending on a required optical quality without limiting thereto.

REFERENCE SIGNS LIST 1, 40, 55, 75, 82, 83 optical receptacle (optical component),
5 photoelectric conversion element (light-emitting element or photodetector),
13, 47, 65 second optical surface (optical surface),
14, 48, 66, 78 optical path area,
15, 50, 67, 80 non-optical path area,
22, 74 optical fiber (optical transmission member),
24 injection molding die,
28 cavity,
33 sloped surface (optical surface cavity inner face),
76 first optical surface (optical surface),
84 first optical fiber (first optical transmission member),
85 second optical fiber (second optical transmission member)

The invention claimed is:

1. An optical component configured to optically connect a photoelectric conversion element and an optical transmission member, the optical component comprising:
an optical surface arranged in a middle of an optical path between the photoelectric conversion element and the optical transmission member to reflect a light traveling along the optical path,
wherein:
the optical surface has an optical path area configured to reflect the light and a non-optical path area other than the optical path area;
the optical path area and the non-optical path area are coplanar,
the optical path area has a smooth surface; and
at least a part of the non-optical path area has a rough surface which is rougher than the optical path area.

2. The optical component according to claim 1, wherein an entirety of the non-optical path area has the rough surface.

3. The optical component according to claim 1, wherein the at least the part of the non-optical path area surrounds the optical path area.

4. The optical component according to claim 1, wherein the at least the part of the non-optical path area surrounds the optical path area in a frame shape.

5. An injection molding method for an optical component configured to optically connect a photoelectric conversion element and an optical transmission member, the optical component having an optical surface arranged in a middle of an optical path between the photoelectric conversion element and the optical transmission member, the optical surface having an optical path area configured to reflect or transmit a light traveling along the optical path and a non-optical path area other than the optical path area, the optical path area and the non-optical path area being coplanar, the injection molding method comprising:
forming the optical component by injecting molten resin into a cavity of an injection molding die;
transferring a smooth surface of an optical surface cavity inner face of the cavity to the optical path area; and
transferring a rough surface which is rougher than the smooth surface on the optical surface cavity inner face of the cavity to at least a part of the non-optical path area.

6. An injection molding die for an optical component configured to optically connect a photoelectric conversion element and an optical transmission member, the optical component having an optical surface arranged in a middle of an optical path between the photoelectric conversion element and the optical transmission member, the optical surface having an optical path area configured to reflect or transmit a light traveling along the optical path and a non-optical path area other than the optical path area, the optical path area and the non-optical path area being coplanar, the injection molding die comprising:
a cavity configured to shape the optical component, the cavity having an optical surface cavity inner face configured to form the optical surface;
wherein:
a portion of the optical surface cavity inner face for shaping the optical path area has a smooth surface; and
a portion for shaping at least a part of the non-optical path area has a rough surface which is rougher than the optical path area.

7. The optical component according to claim 1, wherein:
the optical surface is a second optical surface;
the optical component further comprises a first optical surface facing the photoelectric conversion element and configured to transmit the light and a third optical surface facing the optical transmission member and configured to transmit the light; and
the second optical surface is between the first optical surface and the third optical surface.

8. The optical component according to claim 7, wherein the at least the part of the non-optical path area surrounds the optical path area.

9. The optical component according to claim 7, wherein the at least the part of the non-optical path area surrounds the optical path area in a frame shape.

10. The optical component according to claim 7, wherein an entirety of the non-optical path area has the rough surface.

* * * * *